United States Patent
Batra et al.

(10) Patent No.: US 12,182,954 B2
(45) Date of Patent: Dec. 31, 2024

(54) SYNCHRONIZED EDITING OF LOCALLY REPEATING VECTOR GEOMETRY

(71) Applicant: Adobe Inc., San Jose, CA (US)

(72) Inventors: Vineet Batra, Delhi (IN); Ankit Phogat, Uttar Pradesh (IN)

(73) Assignee: Adobe, Inc., San Jose, CA (US)

( * ) Notice: Subject to any disclaimer, the term of this patent is extended or adjusted under 35 U.S.C. 154(b) by 0 days.

(21) Appl. No.: 17/703,187

(22) Filed: Mar. 24, 2022

(65) Prior Publication Data
US 2022/0215642 A1    Jul. 7, 2022

Related U.S. Application Data

(63) Continuation of application No. 16/918,575, filed on Jul. 1, 2020, now Pat. No. 11,295,535.

(51) Int. Cl.
| | |
|---|---|
| *G06T 19/20* | (2011.01) |
| *G06F 3/0482* | (2013.01) |
| *G06F 3/04845* | (2022.01) |
| *G06T 17/10* | (2006.01) |

(52) U.S. Cl.
CPC .......... *G06T 19/20* (2013.01); *G06F 3/0482* (2013.01); *G06F 3/04845* (2013.01); *G06T 17/10* (2013.01); *G06T 2219/2016* (2013.01)

(58) Field of Classification Search
CPC ... G06F 3/04845; G06F 3/0482; G06T 17/10; G06T 19/20; G06T 2219/2016
See application file for complete search history.

(56) References Cited

U.S. PATENT DOCUMENTS

| | | | |
|---|---|---|---|
| 8,072,452 B1 * | 12/2011 | Brown | G06T 17/20 345/419 |
| 8,698,837 B2 | 4/2014 | Kilgard | |
| 2014/0043342 A1 * | 2/2014 | Goel | G06T 9/00 345/501 |
| 2015/0077420 A1 | 3/2015 | Bolz | |
| 2017/0263034 A1 * | 9/2017 | Kenoff | G06F 3/04842 |
| 2018/0033168 A1 | 2/2018 | Beri et al. | |
| 2018/0137659 A1 | 5/2018 | Sharma et al. | |
| 2018/0286102 A1 * | 10/2018 | Ranganathan | G06T 15/005 |
| 2019/0108663 A1 | 4/2019 | Batra et al. | |

OTHER PUBLICATIONS

Notice of Allowance, U.S. Appl. No. 16/918,575, Nov. 26, 2021, 13 pages.

* cited by examiner

*Primary Examiner* — Andrea C Leggett
(74) *Attorney, Agent, or Firm* — Nicholson DeVos Webster & Elliott LLP

(57) ABSTRACT

Embodiments are disclosed for synchronously editing locally repeating vector geometry. In particular, in one or more embodiments, the disclosed systems and methods comprise receiving a selection of a first plurality of segments of a vector-based object to be edited, generating a stencil mask of the first plurality of segments, the stencil mask representing segment placement and primitive types for each of the first plurality of segments, identifying a second plurality of segments of the vector-based object using the stencil mask and a stencil predicate, determining a transform between the first plurality of segments and the second plurality of segments, receiving an edit to the first plurality of segments, and applying the edit to the second plurality of segments using the transform.

20 Claims, 13 Drawing Sheets

SYNCHRONIZED EDITING OF LOCALLY REPEATING VECTOR GEOMETRY

CROSS-REFERENCE TO RELATED APPLICATIONS

This application is a continuation of U.S. patent application Ser. No. 16/918,575, filed on Jul. 1, 2020, which is expressly incorporated by reference herein in its entirety.

BACKGROUND

1. Technical Field

The present disclosure relates generally to systems and method for editing vector graphics images. More specifically, one or more embodiments of the present disclosure relate to systems and methods that enable repeating geometry in a vector graphics image to be edited synchronously when any one instance of the repeating geometry is edited.

2. Background and Relevant Art

Conventional computer graphic systems enable users to create various types of computer graphics content such as free form illustration, engineering design, or other types of technical or non-technical computer graphics. The computer graphics content created by the designer often includes complex underlying geometry. The most common representation for such geometry uses multiple cubic Bezier splines, each of which is commonly known as a path object. Typically, each path object includes multiple connected cubic Bezier segments.

A common characteristic of such vector-based artwork is a significant amount of fine-grain repeated geometry, which is either induced purposely during the creation process, or is present due to aesthetic sensibilities, such as uniformity and symmetry. However, once created, it is difficult to modify such geometry in a coherent or intuitive manner. Since designers want precise control over the geometry of Bezier paths, including placement of anchor points along the spline, and their handle positions, they have to individually edit each instance of repeating geometry. For example, the designer chooses to reshape a repeating portion of their artwork to show a different appearance or variation in appearance. To do so, they are forced to either recreate the artwork from scratch or to modify the Bezier segments individually. Needless to say, both these options are sub-optimal and tedious.

These and other problems exist with regard to synchronous editing of locally repeating geometry in digital visual media.

BRIEF SUMMARY

Introduced here are techniques/technologies that enable synchronously editing locally repeating vector geometry in vector-based graphics. In particular, in one or more embodiments, the disclosed systems and methods comprise receiving a selection of a first plurality of segments a content design system enables a user to select one or more Bezier segments of a vector-based object. The content design system uses the selected segments to generate a stencil mask. The stencil mask represents which segments have been selected and the primitive type (e.g., line or curve) of the selected segments. This stencil mask is then used to evaluate candidate segments of the vector-based object to identify repeating geometry. For example, the number of candidate segments evaluated at a time is equal to the number of selected segments. The stencil mask is moved along the object one anchor point at a time until all candidate segments have been compared to the stencil mask. If a set of candidate segments matches the stencil mask (e.g., has the same sequence of selected or non-selected segments and matching primitive types), then the content design system determines whether a transform exists to map the selected segments to the candidate segments. If so, the transform is used to map edits made to the selected segments to the matching candidate segments, allowing all matching segments to be edited synchronously.

Additional features and advantages of exemplary embodiments of the present disclosure are set forth in the description which follows, and in part are obvious from the description, or are learnable by the practice of such exemplary embodiments.

BRIEF DESCRIPTION OF THE DRAWINGS

The detailed description is described with reference to the accompanying drawings in which.

DETAILED DESCRIPTION

Figure 1:
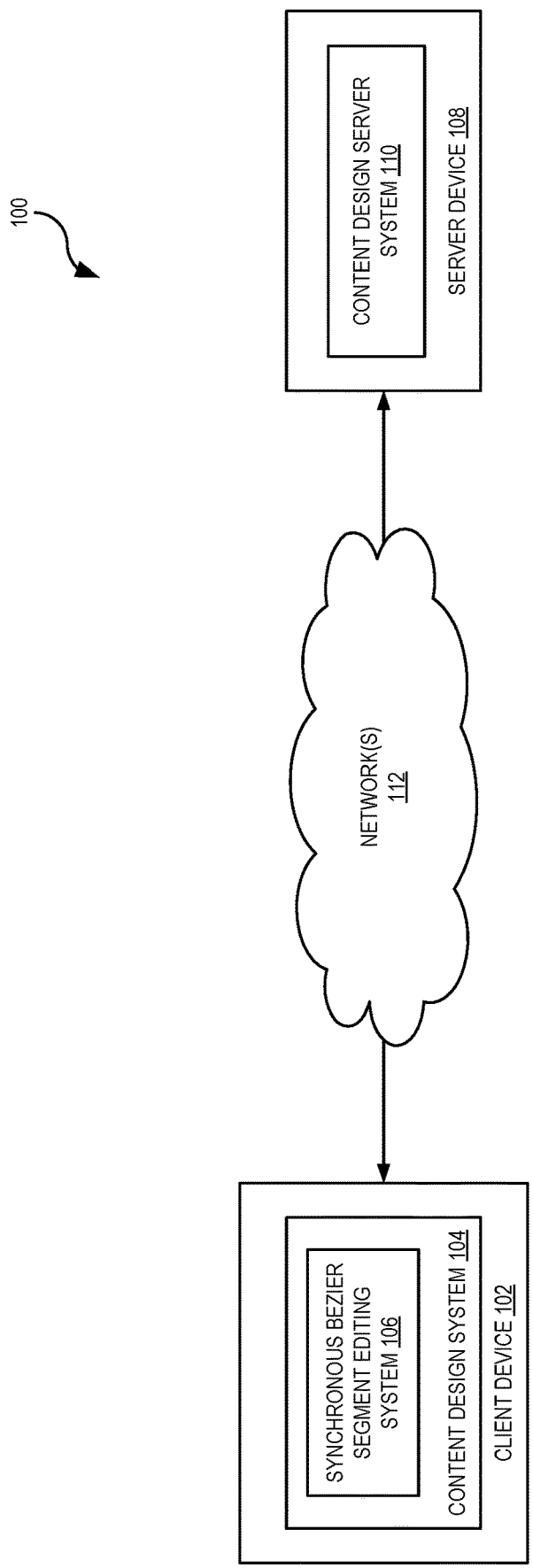
FIG. 1 illustrates a schematic diagram of an exemplary environment in which a content design system is implemented in accordance with one or more embodiments.

One or more embodiments of the present disclosure include a content design system that enables users to synchronously edit repeating geometry in a vector-based graphics. Although repeating geometry is a common feature of vector-based graphics, it is difficult to edit such geometry efficiently and accurately. Typically, to make these edits, a designer must individually edit each instance of the repeating geometry, such as adding modifying, or removing Bezier segments in the drawing. Such edits are extremely difficult to replicate exactly from one instance to another.

Embodiments enable synchronized editing of locally repeating geometry in a given vector-based graphic. When a user selects one or more segments of a vector-based graphic, the content design system automatically identifies repeating sequences of segments in the graphic based on a user-selected stencil predicate. For example, embodiments enable the user to choose to synchronously edit repeating geometries that are linearly displaced, rotationally similar about an axis, affine, reflections, etc.

As the user selects segments, a stencil mask is generated in the order in which the segments are selected. The stencil mask includes all segments that appear between a first selected segment and a last selected segment, including any intervening segments that are not selected. The stencil mask indicates both whether a segment has been selected and, for selected segments, the primitive type of the selected segment. Once the stencil mask has been created, the stencil mask is moved, one anchor point at a time, across the entire object or objects included in the vector-based graphic. Candidate segments are compared to the stencil mask to determine whether primitive types of the candidate segments match the stencil mask. If there is no match, then the stencil mask is incremented by one anchor point along the object and the analysis continues. If there is a match, then embodiments determine whether a transform exists to map the selected segments to the candidate segments based on the user-selected stencil predicate.

The synchronous editing is performed transparently from the designer's perspective. For example, once one or more sets of candidate segments are found to match the stencil mask, the designer then selects and edits shapes as usual. The content design system uses the designer's editing inputs (e.g., movement of anchor points, etc.) and automatically projects the designer's changes to those other instances using the transforms that were identified when determining that a set of candidate segments matched the stencil mask. This enables drawings to be edited more quickly and accurately, without the loss of precision that results from existing systems that require each instance of geometry to be edited individually. Additionally, embodiments allow for traditional editing methods continue to work in the same way and allow for designers to select whether to edit their design synchronously. The projected edits to repeating geometry are made in real-time as the selected segments are edited, providing simultaneous feedback to the designer.

Term Definitions

As used herein, the term "control points" refers to one or more points that define the shape of a Bezier segment. For example, a quadratic Bezier segment includes three control points while a cubic Bezier segment includes four control points.

As used herein, the term "basis points" refers to a set of all control points that define a Bezier curve. For example, the basis points of a quadratic Bezier segment include all three control points while the basis points of a cubic Bezier segment include all four control points.

As used herein, the term "anchor points" refer to a set of points that define the beginning and ends of segments. Anchor points are also added to subdivide an existing segment into subsegments for editing. Anchor points are selected and moved to change the direction and/or curvature of a segment.

As used herein, the term "key segments" refers to the segment or set of segments that are selected by the designer for editing. For example, a vector-based object comprises a plurality of connected Bezier segments. When the user selects one or more of these segments for editing, the selected segments are key segments. Key segments also include any non-selected segments that connect selected segments. For example, in a sequence of segments of a vector-based object, if use selects a first segment, does not select the next segment, and selects the third segment, then the key segments include the first segment, the second segment, and the third segment.

As used herein, the term "candidate segments" refers to the segment or segments being evaluated to determine whether they match the key segments. After a user has selected one or more segments of a vector-based object for editing, these key segments are attempted to be matched to other segments of the vector-based object to identify repeating geometry. These other segments being compared to the key segments are the candidate segments. The number of candidate segments that are evaluated at a time is equal to the number of key segments. For example, if a user selects three key segments, then three candidate segments at a time are compared to the three key segments.

As used herein, the term "stencil mask" refers to a vector, or other data structure, that represents the key segments. The stencil mask indicates both whether a key segment is selected or not (e.g., as a binary mask) and indicates the primitive associated with any selected segments (e.g., line or curve). For example, if the key segments include a line, a curve, a non-selected segment, and a curve, the resulting stencil mask is L-C-0-C, indicating line-curve-not selected-curve.

As used herein, the term "stencil predicate" or "predicate" defines in what way multiple sets of segments need to be similar in order to synchronously edit the sets of segments. For example, a fixed stencil predicate identifies sets of segments that are separated by some distance, but are of the same size, orientation, etc. Alternatively, a similar stencil predicate identifies sets of segments that are of the same size and that are separated by a distance but are rotated around a common axis. Another stencil predicate is an affine stencil predicate, which identifies segments that are separated by a distance, rotated, and/or scaled in size (larger or smaller). Additionally, a reflection stencil predicate identifies segments that are a reflection of the selected segments.

Referring now to the figures, FIG. 1 illustrates a schematic diagram of an exemplary environment 100 within which a synchronous Bezier segment editing system 106 (or simply "editing system" 106) operates. In one or more embodiments, the exemplary environment 100 includes a client device 102, a server device 108, and one or more networks 112. The network(s) 112 include any suitable network over which the computing devices communicate. Example and features of computing devices (e.g., the client device 102 and the server device 108) and networks (e.g., network(s) 112) are discussed in more detail below with regard to FIGS. 12-13.

As illustrated in FIG. 1, the environment 100 includes the client device 102 having a content design system 104 as well as the editing system 106. The content design system 104 generally facilitates the creation, modification, sharing, and/or deletion of graphical content including vector-based content. In one or more embodiments, the content design system 104 is a design application such as ADOBE® ILLUSTRATOR®. In other embodiments, the content design system 104 includes multiple applications, functions, and operations relating to graphical content, such as an application suite, a web-based application, and/or system operations on the client device 102.

As shown in FIG. 1, the content design system 104 includes the editing system 106. In some embodiments, however, the editing system 106 is located on the client device apart from the content design system 104. As mentioned above, and as is explained in detail below, the editing system 106 synchronously edits cubic Bezier splines (e.g., cubic Bezier curves) using various approaches and techniques. As also described previously, the editing system enables vector-based content with repeating geometries to be more efficiently and more accurately edited than conventional systems. Additional detail regarding the editing system 106 is provided below with respect to subsequent figures.

In addition, the environment 100 includes the server device 108. The server device 108 generates, stores, receives, and/or transmits any type of data, including graphical content and/or cubic Bezier splines. As shown, the server device 108 includes a content design server system 110 that communicates with the content design system 104 on the client device 102. For example, the content design server system 110 transmits graphical content to the client device 102, which enables the client device 102 to edit repeating Bezier segments. Notably, while only a single server device is shown, the content design server system 110 is implemented across multiple server devices.

While not illustrated, in one or more embodiments, the server device 108 includes all, or a portion of, the editing system 106, such as within the content design server system 110. For example, when located in the server device 108, the editing system 106 comprises an application running on the server device 108 or a portion of a software application that is downloaded to the client device 102. For instance, the editing system 106 includes a web hosting application that allows the client device 102 to interact with content from the content design server system 110 hosted at the server device 108. In this manner, the server device 108 performs synchronous editing of repeating geometry in vector-based content based on inputs received from a designer using client device 102.

Figure 2:
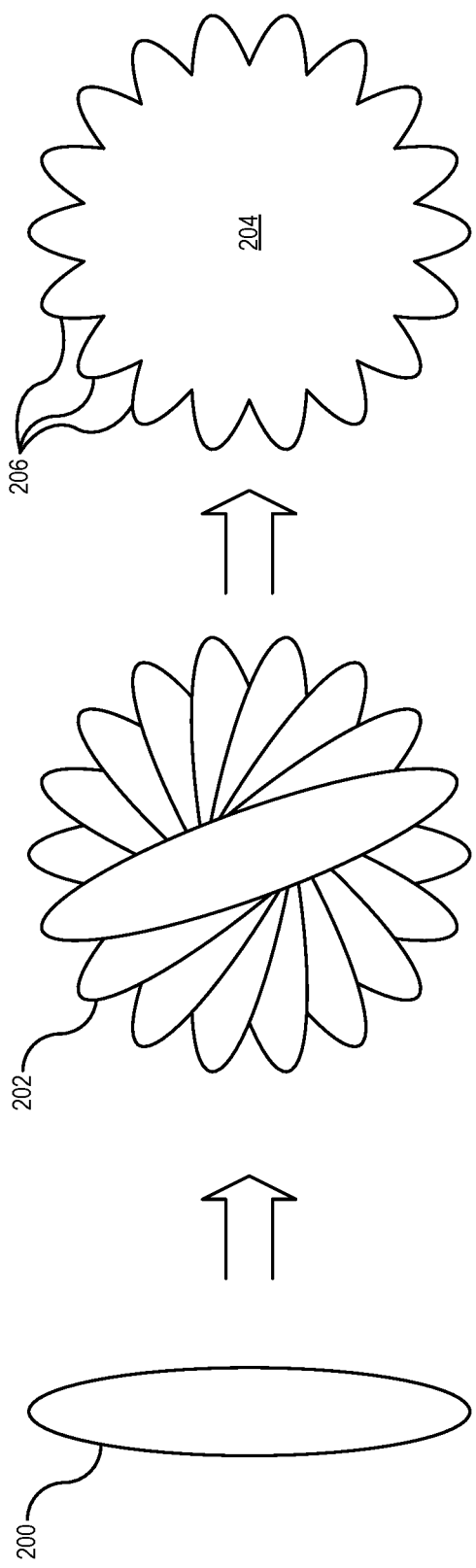
FIG. 2 illustrates a diagram of creating a vector-based design using repeated underlying geometry.

FIG. 2 illustrates a diagram of creating a vector-based design using repeated underlying geometry. As discussed, a content design system enables a designer to create complex shapes based on underlying repeating geometry. For example, as shown in FIG. 2, a designer creates a shape 200 in a content design system. Though an ellipse is shown in FIG. 2, an arbitrary object (e.g., shape, curve, etc.) is created. The designer then duplicates this shape and overlay the duplicate copies of this shape to make a new shape 204. The shapes are then merged to create the merged shape 204. In the example of FIG. 2, a flower shape with numerous petals is created by merging many duplicate ellipses. As a result, the final shape retains a repeating geometry (each petal 206). However, as discussed below with respect to FIG. 3, if the designer subsequently wishes to edit the merged shape 204, the editing process is often tedious and difficult to perform precisely.

Figure 3:
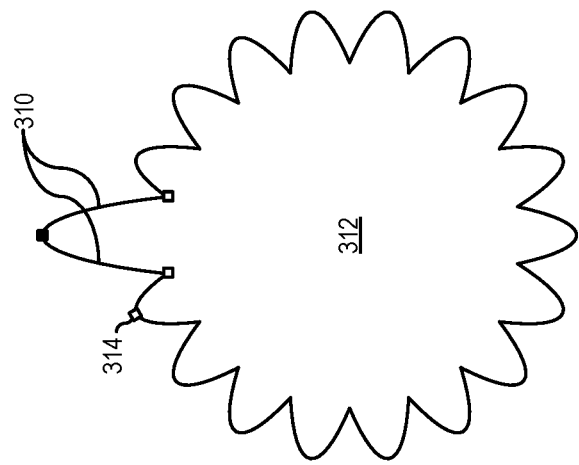
FIG. 3 illustrates a diagram editing a vector-based design.
Figure 3:
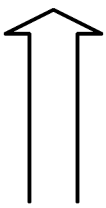
Figure 3:
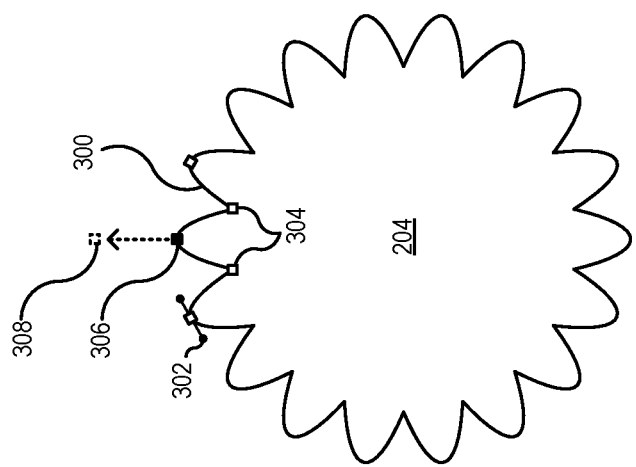

FIG. 3 illustrates a diagram editing a vector-based design. As shown in FIG. 3, merged shape 204 is a merged vector-based object comprising a plurality of segments 300. Each segment is a Bezier curve or a line. In the example shown in FIG. 3, each segment is a Bezier curve. Each segment is defined by a plurality of control points. In vector-based graphics, and as used herein, "control points" refer to a set of points that influence and define the shape of a Bezier spline. For example, a quadratic Bezier spline includes three control points while a cubic Bezier spline includes four control points. Additionally, the end of each segment includes an anchor point 304. As used herein, "anchor points" refer to a set of points that define the beginning and ends of segments. Anchor points are also used to subdivide a segment into subsegments for editing. The anchor points are selected and moved to change the direction and/or curvature of the segment. In some embodiments, control points are connected to anchor points via handles.

For example, as shown in FIG. 3, to edit the merged shape 204, a designer selects an anchor point 302. In the example of FIG. 3, the anchor point 306 is shown as being selected by being filled while unselected anchor points 304 are not filled. The designer selects the anchor point 306 using a user input device, such as a mouse, trackpad, touchscreen, or other device to move a cursor in a graphical user interface (GUI) to the position of the anchor point and selecting it (e.g., clicking, tapping, etc.). The designer changes the shape by selecting and moving (e.g., dragging using a mouse or trackpad, changing the location via input from a keyboard, etc.) the anchor point to a new position as shown at 308. This changes the shape of the segments to which the anchor point is attached (e.g., segments 310), however the remainder of the segments of modified object 312 remain unchanged. As a result, the designer needs to edit anchor point 314 similarly to anchor point 306, and so on at each petal, until the entire shape had been edited. Such manual editing is difficult to perform precisely, with the exact same edit being made to each repeating element of the object. As such it is often easier for designers to start from scratch and make an entirely new object.

Figure 4:
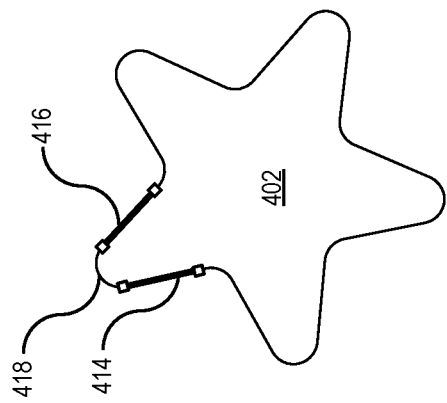
FIG. 4 illustrates examples of stencil masks in accordance with one or more embodiments.
Figure 4:
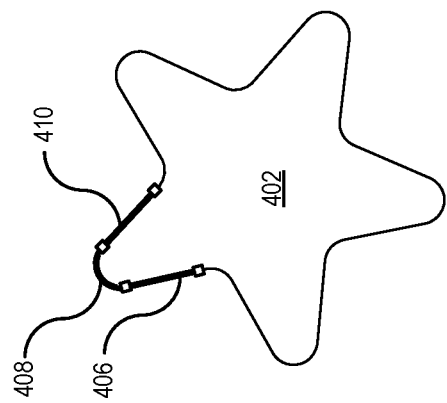
Figure 4:
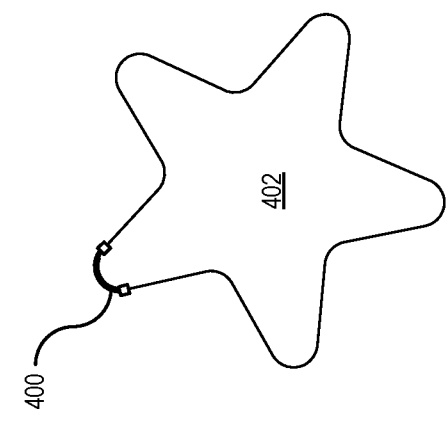

FIG. 4 illustrates examples of stencil masks in accordance with one or more embodiments. In the content design system, to modify one or more segments of an object, the designer selects the one or more segments and/or one or more anchor points. As discussed, this is performed by making the selection via mouse click (or other user input device-action). In addition, modifier keys such as "shift" are used to support multiple non-contiguous selections. In synchronized editing, the selection actions being performed by the designer are tracked and automatically extended to include relevant geometry for simultaneous editing. In some embodiments, the content design system limits extension to other geometry that is part of the same object or includes any relevant geometry in the content being designed (e.g., as part of separate objects).

As the designer selects segments to modify in an object, the content design system creates a stencil mask that represents the relative placement of the selected segment(s) and primitive types of the segment(s) in the object. As used herein the segment or set of segments that are selected by the designer for editing are referred to as the "key segments," and segments being evaluated to determine whether they match the key segments are referred to as "candidate segments."

The stencil mask is formed by starting at the first selected anchor point, or first anchor point of the first selected segment, and continuing until the last selected anchor point, or the last anchor point of the last selected segment. For example, starting from the first selected segment (in order, e.g., [first, . . . , last]), a vector is created which represents the primitive type. In some embodiments, the primitive type includes a curve or a line. The vector is added to as each segment is selected until a last segment is selected. For example, as shown in FIG. 4, a designer selects segment 400 of object 402. In the example of FIG. 4, segment 400 is a curve, and is depicted as being selected via a heavier line. As such, the corresponding stencil mask 404 is C, where C indicates that the segment is a curve, and only one segment has been selected.

Similarly, multiple continuous segments are selected. For example, the designer selects segment 406, followed by segment 408, followed by segment 410. The resulting stencil mask 412 is L-C-L, for line 406, curve 408, and line 410, in the selected order. Additionally, discontinuous segments are also selectable. For example, the designer selects line 414 and line 416, while not selecting curve 418. This results in stencil mask L-0-L, indicating line 414, a skipped segment indicated by "0", and line 416. As such, the stencil masks both indicate whether a segment has been selected or not selected, as well as the primitive of those segments which have been selected.

Once a stencil mask has been determined, then the stencil mask be used to identify related geometry. In effect, the mask acts a fast filter to accumulate the set of candidate segments which are to be selected and edited synchronously. The stencil mask is moved over all segments of the current object in a step-wise manner one anchor point at a time, where in each step, the number of segments examined is same as the length of stencil mask (including "0"s). For example, if the stencil mask is C-0-L-C (e.g., curve, skipped segment, line, curve), then order of testing segments are 0-1-2-3, 1-2-3-4, 2-3-4-5 and so on. At each placement of the stencil mask, segments coinciding with stencil value zero are ignored. Any sets of segments which have the same primitive structure as the segment mask are then evaluated further in conjunction with a stencil predicate as described below.

A stencil predicate defines in what way multiple sets of segments need to be similar in order to synchronously edit the sets of segments. Different predicates are selectable by a user to be used for identifying which sets of candidate segments match a selected set of key segments. For example, a fixed stencil predicate identifies sets of segments that are separated by some distance, but are of the same size, orientation, etc. Alternatively, a similar stencil predicate identifies sets of segments that are of the same size and that are separated by a distance but are rotated around a common axis. Another stencil predicate is an affine stencil predicate, which identifies segments that are separated by a distance, rotated, and/or scaled in size (larger or smaller). Additionally, a reflection stencil predicate identifies segments that are a reflection of the selected segments. For example, an object is symmetrical, and the designer wishes to have like sets of segments edited synchronously.

In some embodiments, the stencil predicates are applied hierarchically. For example, a set of segments matches as both a reflection and a rotation of the selected segments. In such an example, the content design system selects the hierarchically superior transform to be applied. For example, reflection is superior to affine, which is superior to rotation, which is superior to fixed. In this example, the edits are applied as a reflection over being applied as a rotation. In some embodiments, the hierarchy is set by the content design system or is set by the designer. In some embodiments, when more than one type of stencil predicate matches a set of segments the designer is presented with the option of selecting which to apply. For example, a user interface element, such as a window, pop-up, selectable icon, etc. is presented to the designer when the matching sets of segments are added to the editing context. The user interface element lists the synchronous editing options for one or more sets of matching segments. The designer then selects which type of edit is to be applied.

For the predicates described above, the Orthogonal Procrustes algorithm is used for computing shape similarity. In some embodiments, the shape is represented by a point cloud formed by the aggregating Bezier basis points of the set of selected segments (e.g., key segments), and each set of candidate segments. The Bezier basis points include a plurality of points along the line or curve being analyzed and includes the spatial position of each point. Because the number of key segments is the same as the number of candidate segments, there is a one-to-one mapping between these point clouds. Further, for the affine predicate, the point clouds are normalized with respect to their centroids and scale to a fit a unit length bounding box before using the Orthogonal Procrustes to compute rotation (which is then combined with the translation and scale factor to give the final transformation matrix).

In some embodiments. the orthogonal Procrustes algorithm is used to determine a linear transformation, including translation, reflection, orthogonal rotation, and scaling of the Bezier basis points in each key segment to each corresponding candidate segment. If a linear transformation is identified between each corresponding pair of segments, then the key segments and the candidate segments match. The orthogonal Procrustes algorithm returns a transformation matrix which maps the key segments to the candidate segments. The transformation matrix is used to transform the edits made to the key segments and apply the transformed edits to each matching set of candidate segments.

Figure 5:
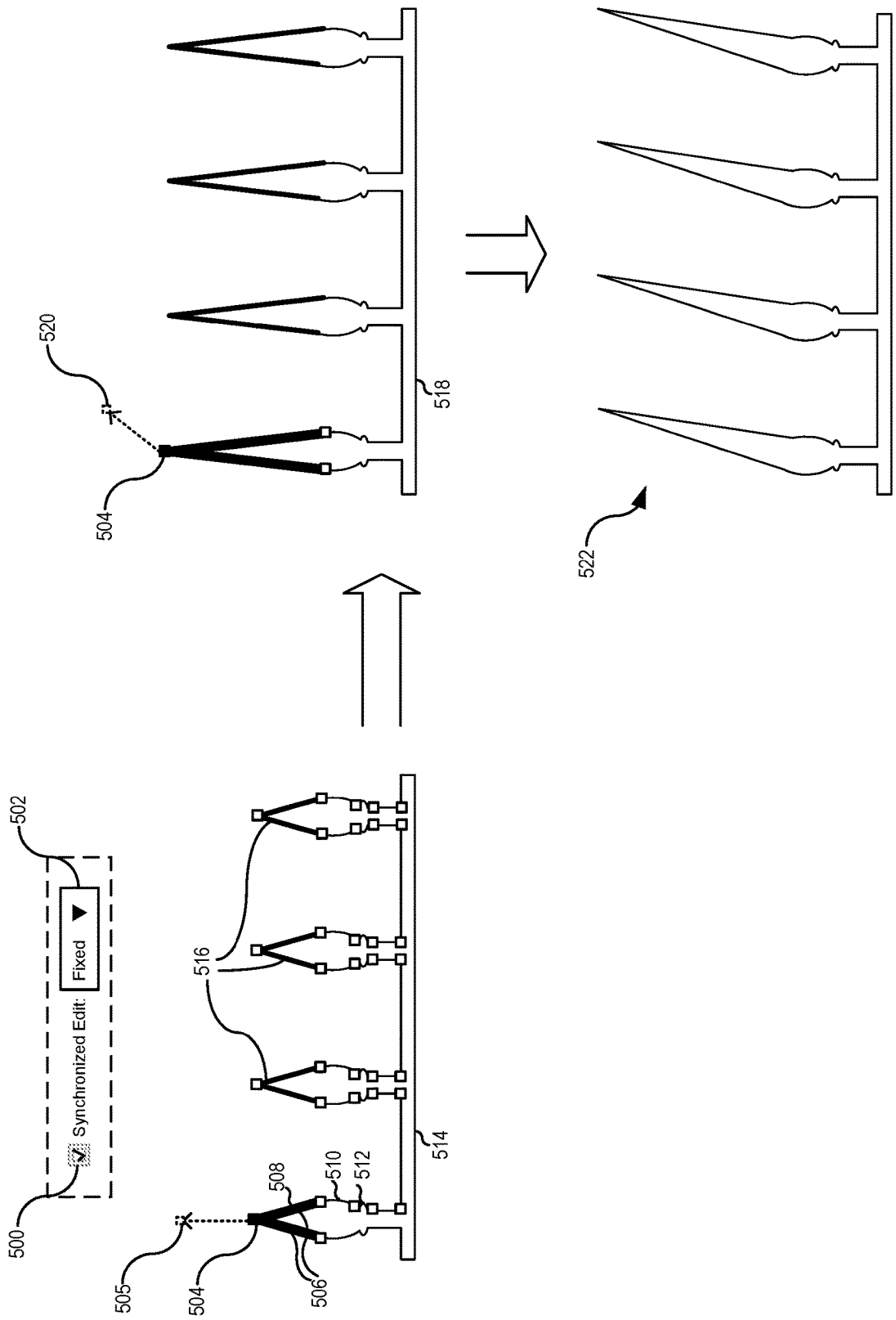
FIG. 5 illustrates an example of synchronized editing of fixed repeating geometry, in accordance with an embodiment.

FIG. 5 illustrates an example of synchronized editing of fixed repeating geometry, in accordance with an embodiment. As shown in FIG. 5, the designer enables synchronized editing by interacting with user interface element 500. Although user interface element 500 is shown as a checkbox, various user interface elements are also usable to enable synchronized editing. The designer also selects the predicate to be used to find matching candidate segments to the key segments selected by the designer using a second user interface element 502. In the example of FIG. 5, the fixed predicate is to be used. Although in the example of FIG. 5, a drop-down menu is shown as the second interface element, in various embodiments, alternative user interface elements are also usable to select the predicate. In some embodiments, enabling synchronized editing and selecting a predicate is performed using the same user interface element. For example, by selecting the fixed predicate 502 shown in FIG. 5 the content design system automatically enables synchronized editing.

As shown in FIG. 5, a designer selects an anchor point 504 which results in the segments connected by that anchor point to be selected, as shown at 506. In the example of FIG. 5, the selected segments are depicted using a heavy weight line. When the key segments have been selected, the content design system identifies candidate segments using a stencil mask. In this example, the two segments are lines, so the stencil mask is L-L. As discussed, the content design system then attempts to match candidate segments using the stencil mask. For example, the stencil mask is moved one anchor point down to and the candidate segments are compared to the stencil mask. One segment down yields segment 508 and segment 510, which are a line and a curve. This does not match the stencil mask, so the content design system incrementally moves on to the next segment. The next two candidate segments are 510 and 512, which are a curve and a curve. This also does not match the stencil mask, so processing increments again by another anchor point. This processing continues over all of the segments of object 514 until matching candidate segments 516 are found.

Once matching segments 516 are found using the stencil mask, then the orthogonal Procrustes algorithm is used to identify the linear transform that maps the key segment to the candidate segments. If a linear transform that is a translation of the key segments is found, then the candidate segments are determined to match the key segments and the designer's selection is extended to the matching segments. This includes adding the matching segments and corresponding linear transforms to an editing context maintained by the content design system. The selection of the matching segments is depicted with a lighter line weight than the key segments, but a heavier line weight than unselected segments. When the designer starts to modify the anchor point or control handle, the operation is normalized with respect to current modification target and is then applied to all relevant segments in the extended selection using each matching set of segment's linear transform. For example, as shown in FIG. 5, the designer moves anchor point 504 to position 505. This results in editing all selected segments as shown in object 518. If the designer then further moves the anchor point (or any other edits), such as moving anchor point 504 to position 520, then the matching segments are likewise synchronously edited as shown at 522.

Although FIG. 5 depicts stretching an anchor point as shown above, this is for simplicity of depiction and description, any arbitrary edits made to the key segments similarly are projected to each matching set of segments using that matching set of segments' linear transform.

Figure 6:
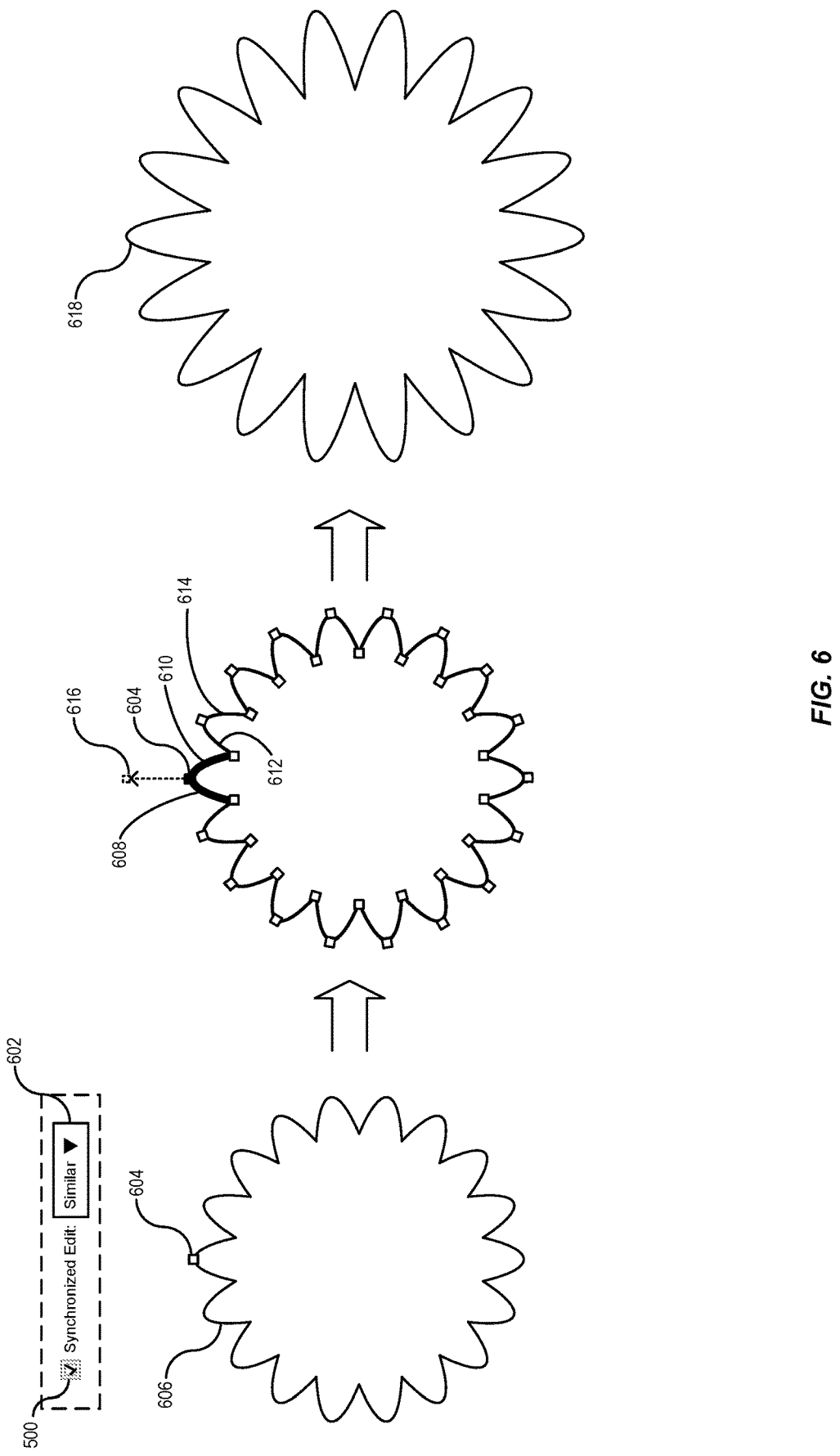
FIG. 6 illustrates an example of synchronized editing of similar repeating geometry, in accordance with an embodiment.

FIG. 6 illustrates an example of synchronized editing of similar repeating geometry, in accordance with an embodiment. Similar to FIG. 5 discussed above, in the example of FIG. 6, synchronous editing is enabled at 500 and the designer selects a similar predicate at 602. The similar predicate identifies candidate segments as matching if a linear transform that includes a translation and/or a rotation is found to map from the key segments to the candidate segments. The designer selects an anchor point 604 or segment of object 606. The selected segments (e.g., the key segments) 608 and 610 are then depicted as being selected (in this example through the use of a heavy line weight).

The stencil mask of the selected segments 608 and 610 is C-C indicating two curve segments have been selected. The content design system uses the stencil mask to identify candidate segments. For example, by incrementing by one anchor point, the content design system compares segment 610 and 612 to the stencil mask. These are both curve segments, so the stencil mask is a match. However, a linear transform using either translation or rotation cannot be made to map the basis points of key segment 608 to candidate segment 610 or to map key segment 610 to candidate segment 612. As such, processing continues by incrementing to the next anchor point. The next two candidate segments 612 and 614 again match the stencil mask. This time, a linear transform is determined to map key segment 608 to candidate segment 612 through translation and rotation and likewise key segment 610 is mapped to candidate segment 614. As such, the selection is extended to these segments. Processing proceeds like this until the entire object has been processed. Because each petal of the object matches the key segments, the selection is extended to the entire object, here depicted with a lighter weight line than the key segments, but heavier than not selected segments. When the designer moves anchor point 604 to position 616, each matching set of segments is synchronously edited using the linear transform for each set of segments in the editing context, as shown at 618.

Although FIG. 6 depicts stretching an anchor point as shown above, this is for simplicity of depiction and description, any arbitrary edits made to the key segments similarly are projected to each matching set of segments using that matching set of segments' linear transform.

Figure 7:
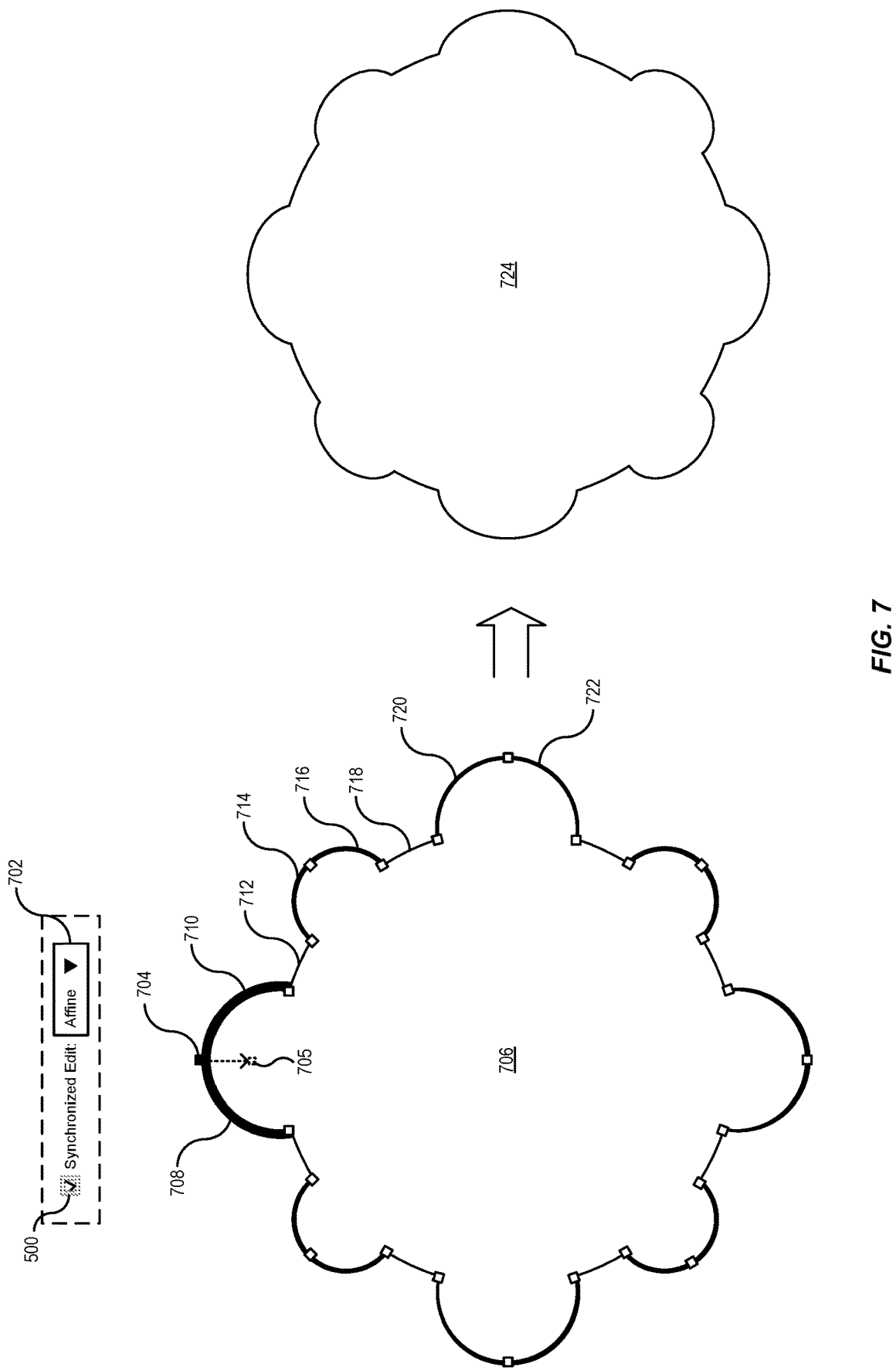
FIG. 7 illustrates an example of synchronized editing of affine repeating geometry, in accordance with an embodiment.

FIG. 7 illustrates an example of synchronized editing of affine repeating geometry, in accordance with an embodiment. Similar to FIGS. 5 and 6 discussed above, in the example of FIG. 7, synchronous editing is enabled at 500 and the designer selects an affine predicate at 702. The affine predicate identifies candidate segments as matching if a linear transform that includes a translation, a rotation, and/or scaling is found to map from the key segments to the candidate segments. The designer selects an anchor point 704 or segment of object 706. The selected segments (e.g., the key segments) 708 and 710 are then depicted as being selected (in this example through the use of a heavy line weight).

The stencil mask of the selected segments 708 and 710 is C-C indicating two curve segments have been selected. The content design system uses the stencil mask to identify candidate segments. For example, by incrementing by one anchor point, the content design system compares segment 710 and 712 to the stencil mask. These are both curve segments, so the stencil mask is a match. However, a linear transform using either translation, rotation, or scaling cannot be made to map the basis points of key segment 708 to candidate segment 710 or to map key segment 710 to candidate segment 712. As such, processing continues by incrementing to the next anchor point. The next two candidate segments 714 and 716 again match the stencil mask. This time, a linear transform is determined to map key segment 708 to candidate segment 714 through translation, rotation, and scaling and likewise key segment 710 is mapped to candidate segment 716. As such, the selection is extended to these segments. Processing proceeds like this until the entire object 706 has been processed. Object 706 includes multiple different sized semi-circles arranged rotationally around a common axis. Each semi-circle either matches the key segments through rotation and translation alone (as shown by segments 720 and 722), or with the addition of a scaling factor (as shown by segments 714 and 716). As discussed above, for the affine predicate, the point clouds of basis points for the key segments are normalized with respect to their centroids and scaled to a fit a unit length bounding box before using the Orthogonal Procrustes to compute rotation (which is then combined with the translation and scale factor to give the final transformation matrix). As such, the selection is extended to each of these semi-circles, as indicated by the heavy weighted lines. The segments connecting each semicircle, such as segments 712 and 718, are not selected. When the designer moves anchor point 704 to position 705, each matching set of segments is synchronously edited using the linear transform for each set of segments in the editing context, with the results shown in object 724.

Although FIG. 7 depicts stretching an anchor point as shown above, this is for simplicity of depiction and description, any arbitrary edits made to the key segments are similarly projected to each matching set of segments using that matching set of segments' linear transform.

Figure 8:
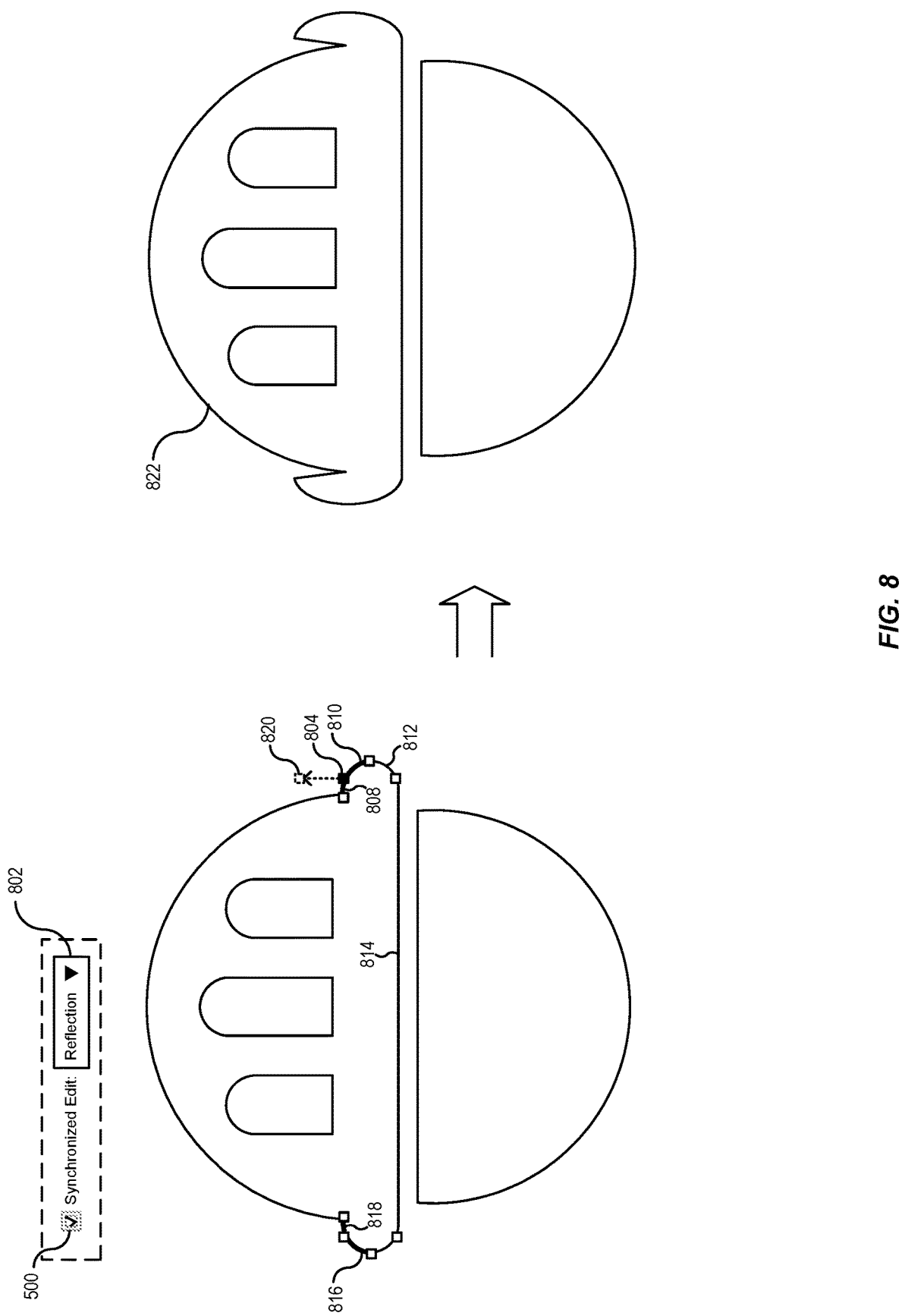
FIG. 8 illustrates an example of synchronized editing of reflected geometry, in accordance with an embodiment.

FIG. 8 illustrates an example of synchronized editing of reflected geometry, in accordance with an embodiment. Similar to FIGS. 5-7 discussed above, in the example of FIG. 8, synchronous editing is enabled at 500 and the designer selects the reflection predicate at 802. The reflection predicate identifies candidate segments as matching if a linear transform that includes a translation, a rotation, scaling, and/or reflection is found to map from the key segments to the candidate segments. The designer selects an anchor point 804 or segment of the object. The selected segments (e.g., the key segments) 808 and 810 are then depicted as being selected (in this example through the use of a heavy line weight).

The stencil mask of the selected segments 808 and 810 is L-C indicating a line segment and a curve segment have been selected. The content design system uses the stencil mask to identify candidate segments. For example, by incrementing by one anchor point, the content design system compares segment 810 and 812 to the stencil mask. These are both curve segments, so the stencil mask is not a match. As such, processing continues by incrementing to the next anchor point. The next two candidate segments 812 and 814 are a curve and a line, which also does not match the stencil mask, as the stencil mask is line-curve. Processing proceeds like this until candidate segments 816 and 818 are identified. These candidate segments are a reflection of the key segments 808 and 810. As such, the selection is extended to these segments. The basis point clouds for these segments are used to determine a linear transform using the Orthogonal Procrustes to compute rotation, translation, and reflection to map the key segments to the candidate segments. As such, the selection is extended to each of these semicircles, as indicated by the heavy weighted lines. When the designer moves anchor point 804 to position 820, the edits are transformed into their reflection and applied to the candidate segments synchronously, with the results shown in object 822.

Although FIG. 8 depicts stretching an anchor point as shown above, this is for simplicity of depiction and description, any arbitrary edits made to the key segments are similarly projected to each matching set of segments using that matching set of segments' linear transform.

Figure 9:
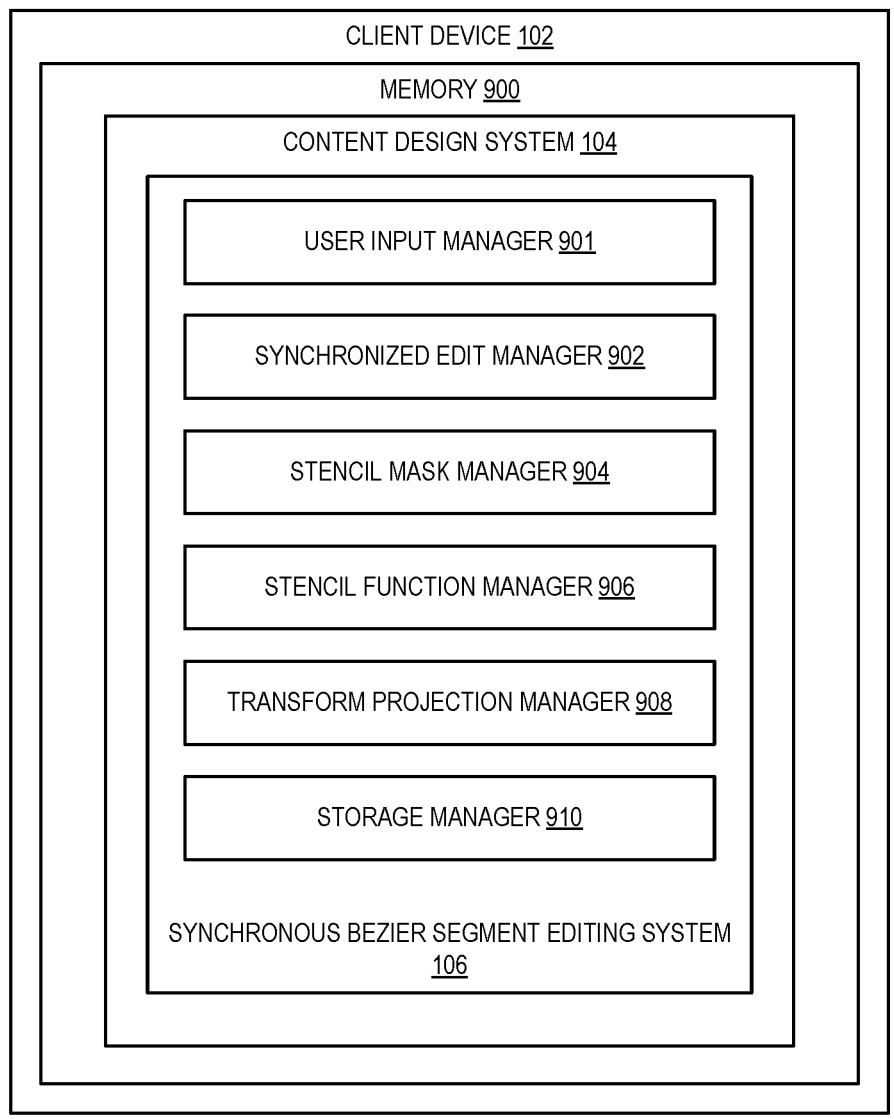
FIG. 9 illustrates a schematic diagram of a content design system in accordance with one or more embodiments.

FIG. 9 illustrates a schematic diagram of a synchronous Bezier segment editing system 106 in accordance with one or more embodiments. In particular, FIG. 9 shows a schematic diagram of the editing system 106, the client device 102, and the content design system 104 described above in relation to FIG. 1. As mentioned in relation to FIG. 1, in one or more embodiments, some or all of the components of the editing system 106 are implemented separately from the content design system 104 and the client device 102.

As shown, the client device 102 includes memory 900, including volatile memory, non-volatile memory, storage media, etc. as further described below with respect at least to FIG. 12. The editing system is stored in memory as program code, data structures, etc. and includes a user input manager 901, a synchronized edit manager 902, a stencil mask manager 904, a stencil function manager 906, a transform projection manager 908, and a storage manager 910.

The synchronous Bezier segment editing system 106 includes a user input manager 901 that allows users to provide input to the editing system. For example, the user input manager 901 allows users to select one or more vector graphics-based objects to edit. In some embodiments, the user input manager 901 enables a user to select one or more segments in a vector graphics file stored or accessible by storage manager 910. Additionally, the user input manager 901 allows users to enable or disable synchronized editing, select a stencil predicate, hierarchically rank stencil predicates, etc.

In one or more embodiments, the synchronized edit manager 902 applies edits made by a designer to one or more key segments to matching sets of segments. As discussed, the matching sets of segments are identified using a stencil mask. Additionally, the synchronized edit manager 902 enables or disables synchronous editing based on input received from the user via user input manager 1003. As discussed, the user enables or disables synchronous editing by interacting with a graphical user interface element, such as a radio button, check box, drop-down menu, etc. When enabled and a user makes a selection of one or more key segments, the key segments are provided to stencil mask manager 904.

Stencil mask manager 904 receives the selection of one or more segments and/or anchor points a build the stencil mask as a vector, or other data structure. For example, the stencil mask manager uses the storage manager to create a vector in memory and write values to it as segments are selected. The stencil mask manager identifies the primitive of each selected segment (e.g., line or curve), and write a value indicating the primitive value to the vector. As discussed above, these are indicated as L or C, however, in some embodiments, alternative values are used to indicate the primitive type. Additionally, more primitive types are used in some embodiments.

Using the stencil mask, stencil mask manager 904 identifies candidate segments. The number of candidate segments being evaluated at one time equals the length of the stencil mask vector. When a set of candidate segments match the stencil, the stencil mask manager adds the candidate segments to an editing context and mark those candidate segments for extended selection. These segments are indicated to the user through a suitable visual annotation (for example, as discussed above, the line weight of selected segments is changed to indicate their selection). As such, the designer is informed about the current context of synchronized editing.

Stencil function manager 906 defines the types of predicates available to determine which candidate segments match the key segments, such as fixed, similar, affine, and reflection, discussed above. Although the above four examples of predicates have been discussed, in various embodiments, the synchronous Bezier segment editing system 106 supports more or fewer predicates. In some embodiments, the stencil function manager 906 invokes the transform projection manager 908 when a set of candidate segments match the stencil mask, to determine whether an appropriate transform for the selected stencil predicate is determined.

For every set of candidate segments matching the stencil mask, and thus added to the editing context; the transform projection manager computes a transform to map from the key segments to the candidate segments. For example, in the case of the similar predicate, the transform projection manager 908 computes a displacement and a rotation of the candidate segments with respect to key segments, while in case of the affine predicate the transform projection manager 908 computes a transformation matrix mapping the key segments to the candidate segments.

When the designer starts editing the key segments, the synchronized edit manager 902 applies the corresponding transform determined by the transform projection manager 908 to each segment in the editing context, thereby resulting in a synchronized edit operation to all matching segments. For example, as the designer is dragging the handles of a selected segment, it results in a modified segment. As the transform projection manager 908 has computed transform functions for each pair of original key segment and matching candidate segment, the synchronized edit manager 902 applies the corresponding transform to the modified key segment to compute modified the candidate segments.

In some embodiments, the transform projection manager keeps track of the displacement of anchor and/or control points and then apply the same displacement to the corresponding anchors and/or control points of the candidate segments to propagate the edits synchronously to all matching sets of candidate segments.

In some embodiments, the edit operation is generalized to include adding and removing of anchor points as well. Further, the similarity predicate remains preserved even after an editing operation. Therefore, designer is free to combine multiple such editing operations in a sequence for a seamless experience.

In some embodiments, the designer removes one or more matching sets of candidate segments from the editing context. For example, as discussed when a set of candidate segments is added to the editing context, the set of candidate segments is highlighted with a visual indication of the selection (e.g., heavier line weight, change in color, etc.). The designer then selects one or more of the sets of highlighted segments to remove a particular set from the editing context or add a set back into the editing context that the designer removed. This way, the designer selectively decides which of the matching sets of segments are to be synchronously edited.

In some embodiments, the transform projection manager determines a set of segments is within a threshold difference of matching the key segments. For example, the content design system, in some embodiments, is configured to interpret a difference of a few pixels (e.g., less than 10, or other threshold value) as indicating that the segments were intended to be matching segments, but due to an error the segments are slightly off. The transform projection manager 908 extends the selection to such segments and modify the segments to match the key segments. The synchronized edit manager then synchronously applies edits to these segments along with any other matching sets of segments.

As illustrated in FIG. 9, the content design system 104 also includes a storage manager 910. In general, the storage manager 910 maintains, stores, organizes, and/or retrieves data associated with the editing system 106. For example, the storage manager 910 maintains an editing context and a stencil mask, as described above. Further, the storage manager 910 communicates with other components of the editing system 106 to facilitate identifying and synchronously editing matching segments.

Although embodiments have been described with respect to identifying matching geometry in a single object, in various embodiments, the described techniques are applied to multiple objects in addition to the object being edited. This enables a Find/Replace workflow for vector graphics, where the designer selects the segments and search for all such instances, and also specifies new segments with which to replace current segments. In addition, the scope of this operation is extendable to an entire document, or all open documents. Here, the match function is a combination of stencil mask and stencil predicate described above.

Each of the components 904-910 of the content design system 104 and their corresponding elements (as shown in FIG. 9) are in communication with one another using any suitable communication technologies. It is recognized that although components 904-910 and their corresponding elements are shown to be separate in FIG. 9, any of components 904-910 and their corresponding elements are combined into fewer components, such as into a single facility or module, divided into more components, or configured into different components as serves a particular embodiment.

The components 904-910 and their corresponding elements comprise software, hardware, or both. For example, the components 904-910 and their corresponding elements comprise one or more instructions stored on a computer-readable storage medium and executable by processors of one or more computing devices. When executed by the one or more processors, the computer-executable instructions of the content design system 104 cause a client device and/or a server device to perform the methods described herein. Alternatively, the components 904-910 and their corresponding elements comprise hardware, such as a special purpose processing device to perform a certain function or group of functions. Additionally, the components 904-910 and their corresponding elements comprise a combination of computer-executable instructions and hardware.

Furthermore, the components 904-910 of the content design system 104, for example, are implementable as one or more stand-alone applications, as one or more modules of an application, as one or more plug-ins, as one or more library functions or functions that are called by other applications, and/or as a cloud-computing model. Thus, the components 904-910 of the content design system 104 are implemented as a stand-alone application, such as a desktop or mobile application. Furthermore, the components 904-910 of the content design system 104 are implemented as one or more web-based applications hosted on a remote server. Alternatively, or additionally, the components of the content design system 104 are implemented in a suit of mobile device applications or "apps." To illustrate, the components of the content design system 104 are implemented in a digital image editing application, including but not limited to ADOBE® ILLUSTRATOR®, ADOBE® PHOTOSHOP®, or ADOBE® CREATIVE CLOUD®. "ADOBE," "ILLUSTRATOR," "PHOTOSHOP," and "CREATIVE CLOUD" are either registered trademarks or trademarks of Adobe Systems Incorporated in the United States and/or other countries.

Figure 10:
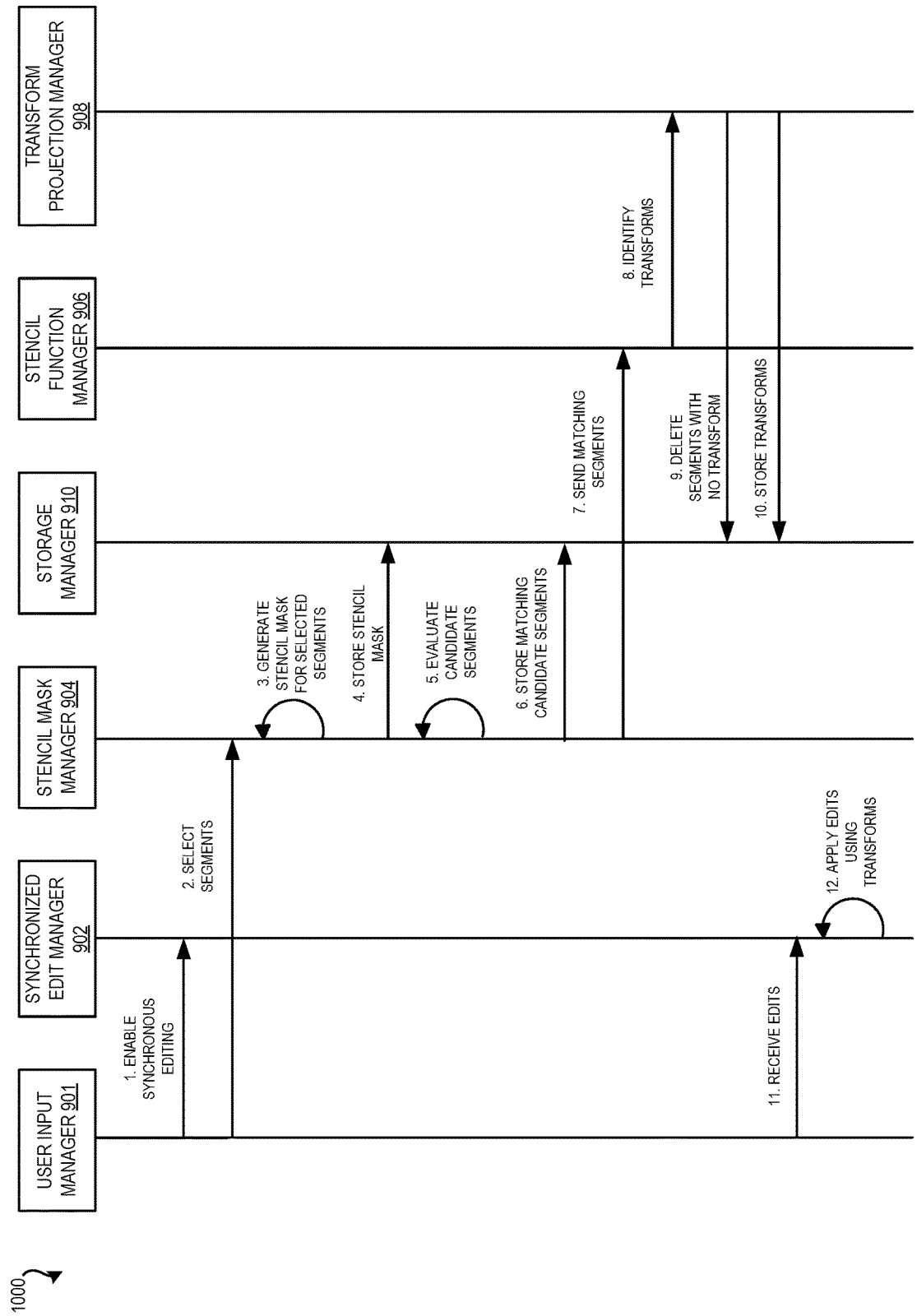
FIG. 10 illustrates a sequence diagram of a content design system in accordance with one or more embodiments.

FIG. 10 illustrates a sequence diagram 1000 of a content design system in accordance with one or more embodiments. As shown in FIG. 10, a user makes a selection of a graphical user interface element to enable synchronous editing. This input is received by user input manager 901 and at numeral 1 instructs the synchronized edit manager 902 to enable synchronous editing. Subsequently, when the user selects one or more segments of a vector-based object, the selected segments are passed to stencil mask manager 904 by user input manager 901, as shown at numeral 2.

At numeral 3, stencil mask manager 904 generates a stencil mask for the selected segments. As described above, the stencil mask represents a contiguous set of segments that includes the selected segments and any non-selected segments between the selected segments. The stencil mask indicates both whether a segment is selected or non-selected, and a primitive type (e.g., curve or line) associated with the selected segments. At numeral 4, the stencil mask, which in some embodiments is a data structure, such as a vector, is stored in memory using storage manager 910. At numeral 5, the stencil mask manager 904 moves the stencil mask along the vector-based object one anchor point at a time to identify a set of candidate vectors. Each set of candidate vectors has a number of segments equal to the number of segments in the stencil mask. As discussed, the candidate segments are evaluated by comparing the primitive type of each candidate segment to a corresponding segment of the stencil mask. If all candidate segments in a set of candidate segments match, then the set of segments is stored in an editing context (e.g., an allocated region of memory, buffer, or other storage location) by storage manager 910 at numeral 6. If all candidate segments of a set of candidate segments do not match, then the mask is moved one anchor point further down the vector-based object and the next set of candidate segments is evaluated. This continues until all sets of candidate segments in a drawing have been evaluated.

At numeral 7, any sets of matching candidate segments are sent to stencil function manager 906 to determine whether a transform exists to map the key segments to the matching candidate segments. As discussed, the stencil function manager maintains one or more stencil predicates used to determine whether a set of candidate segments is a match to the key segments. In some embodiments, the stencil predicate includes a fixed predicate, a similar predicate, an affine predicate, or a reflection predicate, as discussed above. The stencil function manager 906 requests transform projection manager 908 to identify a transform for the selected stencil predicate for a given set of candidate segments. Depending on the stencil predicate, the transform includes a translation (e.g., for a fixed predicate), a translation and/or rotation (e.g., for a similar predicate), a translation, rotation, and/or scaling (e.g., for an affine predicate) or a translation, rotation, scaling, and/or reflection (e.g., for a reflection predicate).

At numeral 9, if no appropriate transform is identified, the transform projection manager 908, or in some embodiments the stencil function manager 906, deletes the candidate segments from the editing context. If a transform is identified, then at numeral 10 the transform is stored for use by the synchronized edit manager 902 to apply edits synchronously to all matching segments. In some embodiments, this is iteratively performed for every set of matching candidate segments identified by stencil mask manager 904 until all sets have been processed.

At numeral 11, edits to the selected segments are received from the user via user input manager 901. For example, as discussed, the user moves one or more anchor points and/or control points to a different location. These edits are provided to the synchronized edit manager 902 which transforms the edits using the transforms in the editing context and projects the changes to all matching sets of segments in the drawing, making the edits synchronously to all matching segments.

Figure 11:
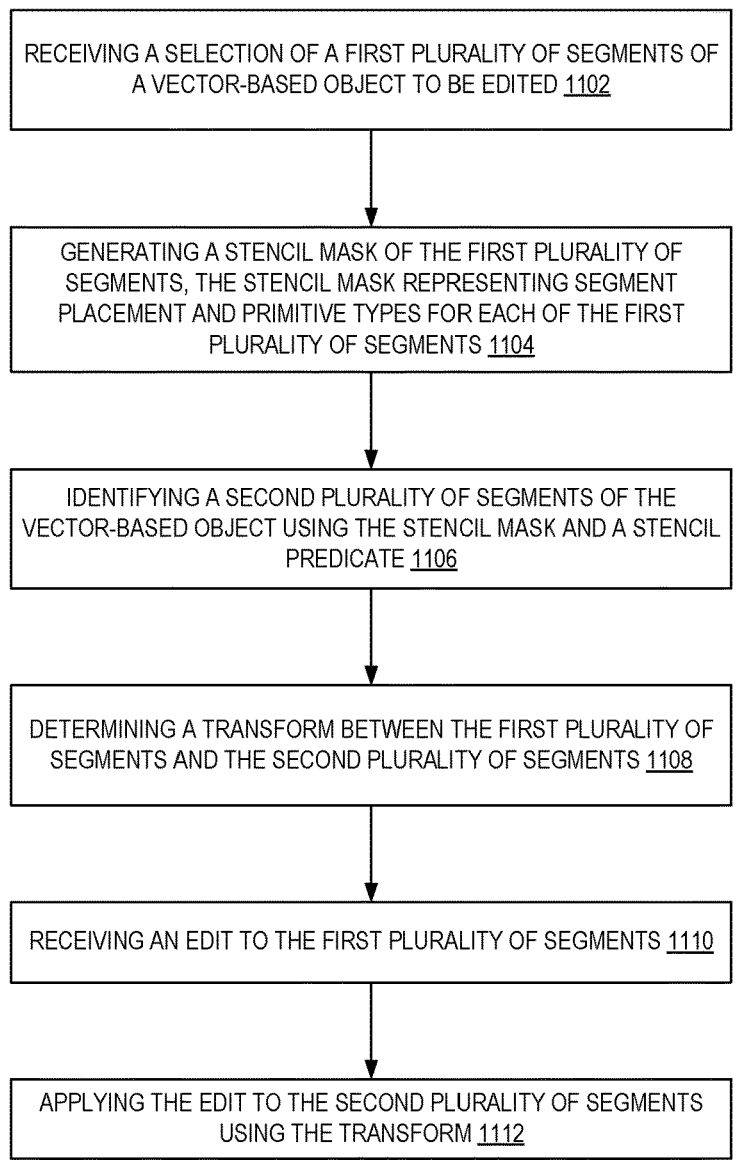
FIG. 11 illustrates a flowchart of a series of acts in a method of synchronized editing of vector-based shapes in accordance with one or more embodiments.

FIGS. 1-10, the corresponding text, and the examples, provide a number of different systems and devices that allows a user to facilitate selection of target individuals within digital visual media. In addition to the foregoing, embodiments are described in terms of flowcharts comprising acts and steps in a method for accomplishing a particular result. For example, FIG. 11 illustrates flowcharts of exemplary methods in accordance with one or more embodiments. The methods described in relation to FIG. 11 are performable with fewer or more steps/acts or the steps/acts are performable in differing orders. Additionally, the steps/acts described herein are repeatable or performable in parallel with one another or in parallel with different instances of the same or similar steps/acts.

FIG. 11 illustrates a flowchart of a series of acts in a method of synchronized editing of vector-based shapes in accordance with one or more embodiments. In one or more embodiments, the method 1100 is performed in a digital medium environment that includes the content design system 114. The method 1100 is intended to be illustrative of one or more methods in accordance with the present disclosure and is not intended to limit potential embodiments. Alternative embodiments include additional, fewer, or different steps than those articulated in FIG. 11.

As illustrated in FIG. 11, the method 1100 includes an act 1102 of receiving a selection of a first plurality of segments of a vector-based object to be edited. For example, the designer selects via a user input device (such as a mouse, trackpad, touchscreen, etc.) one or more anchor points or segments of an object. The object includes segments that are curves (e.g., Bezier curves) or lines. As discussed, in some embodiments, the selection of the first plurality of segments is received using user input manager 901 described above.

As illustrated in FIG. 11, the method 1100 includes an act 1104 of generating a stencil mask of the first plurality of segments, the stencil mask representing segment placement and primitive types for each of the first plurality of segments. For example, as segments are selected a vector is created in memory which represents the selected segments in the order in which they are selected. Each entry in the vector identifies the primitive of the selected segment (e.g., curve or line). Additionally, for a selection of discontinuous segments, any unselected segments between selected segments are represented in the vector by an indication that a segment was not selected (e.g., a value of "0"). As discussed, in some embodiments, the stencil mask is generated by stencil mask manager 904 described above.

As illustrated in FIG. 11, the method 1100 includes an act 1106 of identifying a second plurality of segments of the vector-based object using the stencil mask and a stencil predicate. As discussed, the stencil mask is applied incrementally one anchor point at a time to segments of the object to identify candidate segments. As discussed, in some embodiments, a second plurality of segments is identified by stencil mask manager 904 described above. The number of candidate segments considered is equal to the number of entries in the stencil mask. Each segment from the first plurality of segments is compared to a corresponding segment from the candidate segments to determine whether the segments match. If all of the candidate segments match the corresponding first plurality of segments, then the selection is extended to the candidate segments. Processing continues until all of the segments of the object have been evaluated.

As illustrated in FIG. 11, the method 1100 includes an act 1108 of determining a transform between the first plurality of segments and the second plurality of segments. As discussed, in some embodiments, the transform is determined by transform projection manager 908 described above based on the stencil predicate specified by stencil function manager 906 described above. The transform is used to map the segments of the first plurality of segments to the second plurality of segments. In some embodiments, the transform is identified using an orthogonal Procrustes algorithm. Depending on the stencil predicate, the transform includes a translation (e.g., for a fixed predicate), a translation and/or rotation (e.g., for a similar predicate), a translation, rotation, and/or scaling (e.g., for an affine predicate) or a translation, rotation, scaling, and/or reflection (e.g., for a reflection predicate).

As illustrated in FIG. 11, the method 1100 includes an act 1110 of receiving an edit to the first plurality of segments. As discussed, in some embodiments, the edit to the first plurality of segments is received using user input manager 901 described above. For example, a designer selects an anchor point and/or control point on the first plurality of segments and move the anchor point and/or control point to a new position. As illustrated in FIG. 11, the method 1100 includes an act 1112 of applying the edit to the second plurality of segments using the transform. For example, the transform identified for the second plurality of segments is used to map the edit to the second plurality of segments. This enables the second plurality of segments to be edited synchronously, in real time, with the edits being made to the first plurality of segments. As discussed, in some embodiments, the selection of the first plurality of segments is received using synchronized edit manager 902 described above.

In some embodiments, the method 1100 further includes the acts of identifying a plurality of other pluralities of segments using the stencil mask, extending the selection to the plurality of other pluralities of segments, determining transforms relative to the first plurality of segments for each plurality of segments from the plurality of segments, and applying the edit to each plurality of segments from the plurality of plurality of segments using its corresponding transform. As discussed, in some embodiments, identifying other pluralities of segments is performed using stencil mask manager 904 described above. In some embodiments, extending the selection is performed using stencil mask manager 904 based on whether a transform is identified by transform projection manager 908 described above. Additionally, in some embodiments, determining the transforms is performed using transform projection manager 908 described above. Further, in some embodiments, the edit is applied to each plurality of segments by the synchronized edit manager 902 described above.

Figure 12:
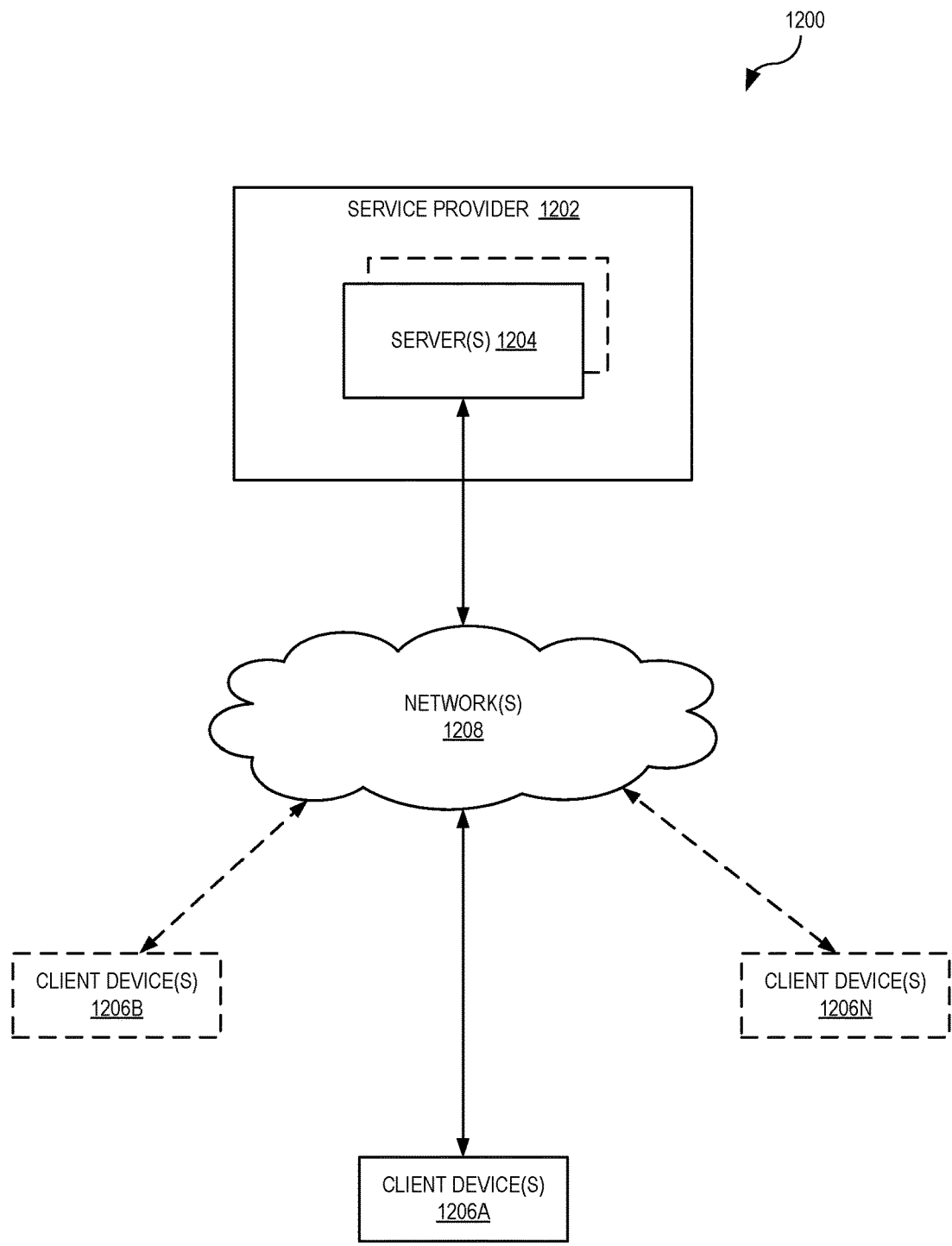
FIG. 12 illustrates a schematic diagram of an exemplary environment in which the content design system operates in accordance with one or more embodiments.

FIG. 12 illustrates a schematic diagram of an exemplary environment 1200 in which the content design system 104 operates in accordance with one or more embodiments. In one or more embodiments, the environment 1200 includes a service provider 1202 which includes one or more servers 1204 connected to a plurality of client devices 1206A-1206N via one or more networks 1208. The client devices 1206A-1206N, the one or more networks 1208, the service provider 1202, and the one or more servers 1204 communicate with each other or other components using any communication platforms and technologies suitable for transporting data and/or communication signals, including any known communication technologies, devices, media, and protocols supportive of remote data communications, examples of which are described in more detail below with respect to FIG. 13.

Although FIG. 12 illustrates a particular arrangement of the client devices 1206A-1206N, the one or more networks 1208, the service provider 1202, and the one or more servers 1204, various additional arrangements are possible. For example, the client devices 1206A-1206N directly communicate with the one or more servers 1204, bypassing the network 1208. Or alternatively, the client devices 1206A-1206N directly communicate with each other. The service provider 1202 is a public cloud service provider which owns and operates their own infrastructure in one or more data centers and provides this infrastructure to customers and end users on demand to host applications on the one or more servers 1204. The servers include one or more hardware servers (e.g., hosts), each with its own computing resources (e.g., processors, memory, disk space, networking bandwidth, etc.) which are securely divided between multiple customers, each of which host their own applications on the one or more servers 1204. In some embodiments, the service provider is a private cloud provider which maintains cloud infrastructure for a single organization. The one or more servers 1204 similarly include one or more hardware servers, each with its own computing resources, which are divided among applications hosted by the one or more servers for use by members of the organization or their customers.

Similarly, although the environment 1200 of FIG. 12 is depicted as having various components, the environment 1200 has additional or alternative components. For example, the environment 1200 is implemented on a single computing device with the content design system 104. In particular, the content design system 104 is implemented in whole or in part on the client device 1202A.

As illustrated in FIG. 12, the environment 1200 includes client devices 1206A-1206N. The client devices 1206A-1206N comprise any computing device. For example, client devices 1206A-1206N comprise one or more personal computers, laptop computers, mobile devices, mobile phones, tablets, special purpose computers, TVs, or other computing devices, including computing devices described below with regard to FIG. 13. Although three client devices are shown in FIG. 12, it is appreciated that client devices 1206A-1206N comprise any number of client devices (greater or smaller than shown).

Moreover, as illustrated in FIG. 12, the client devices 1206A-1206N and the one or more servers 1204 communicate via one or more networks 1208. The one or more networks 1208 represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1208 include any suitable network over which the client devices 1206A-1206N access service provider 1202 and server 1204, or vice versa. The one or more networks 1208 are discussed in more detail below with regard to FIG. 13.

In addition, the environment 1200 also includes one or more servers 1204. The one or more servers 1204 generate, store, receive, and/or transmit any type of data, including input image data 1012, output image data 1014, or other information. For example, a server 1204 receives data from a client device, such as the client device 1206A, and send the data to another client device, such as the client device 1202B and/or 1202N. The server 1204 also transmits electronic messages between one or more users of the environment 1200. In one example embodiment, the server 1204 is a data server. The server 1204 also comprises a communication server or a web-hosting server. Additional details regarding the server 1204 are discussed below with respect to FIG. 13.

As mentioned, in one or more embodiments, the one or more servers 1204 include or implement at least a portion of the content design system 104. In particular, the content design system 104 comprises an application running on the one or more servers 1204 or a portion of the content design system 104 is downloaded from the one or more servers 1204. For example, the content design system 104 includes a web hosting application that allows the client devices 1206A-1206N to interact with content hosted at the one or more servers 1204. To illustrate, in one or more embodiments of the environment 1200, one or more client devices 1206A-1206N access a webpage supported by the one or more servers 1204. In particular, the client device 1206A runs a web application (e.g., a web browser) to allow a user to access, view, and/or interact with a webpage or website hosted at the one or more servers 1204.

Upon the client device 1206A accessing a webpage or other web application hosted at the one or more servers 1204, in one or more embodiments, the one or more servers 1204 provide access to one or more drawing files that include locally repeating Bezier geometry stored at the one or more servers 1204. Moreover, the client device 1206A receives a request (i.e., via user input) to modify one or more segments of one instance of the locally repeating Bezier geometry, and provide the request to the one or more servers 1204. Upon receiving the request, the one or more servers 1204 automatically performs the methods and processes described above to synchronously edit all instances of the locally repeating Bezier geometry in the drawing file.

As just described, the content design system 104 is implemented in whole, or in part, by the individual elements 1202-1208 of the environment 1200. It is appreciated that although certain components of the content design system 104 are described in the previous examples with regard to particular elements of the environment 1200, various alternative implementations are possible. For instance, in one or more embodiments, the content design system 104 is implemented on any of the client devices 1206A-N. Similarly, in one or more embodiments, the content design system 104 is implemented on the one or more servers 1204. Moreover, different components and functions of the content design system 104 is implemented separately among client devices 1206A-1206N, the one or more servers 1204, and the network 1208.

Embodiments of the present disclosure comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein are implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media include any available media that are accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which is used to store desired program code means in the form of computer-executable instructions or data structures and which is accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links which are used to carry desired program code means in the form of computer-executable instructions or data structures and which are accessed by a general purpose or special purpose computer. Combinations of the above are included within the scope of computer-readable media.

Further, upon reaching various computer system components, program code means in the form of computer-executable instructions or data structures are transferred automatically from transmission media to non-transitory computer-readable storage media (devices) (or vice versa). For example, computer-executable instructions or data structures received over a network or data link are buffered in RAM within a network interface module (e.g., a "NIC"), and then eventually transferred to computer system RAM and/or to less volatile computer storage media (devices) at a computer system. Thus, it is to be understood that non-transitory computer-readable storage media (devices) are included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions are, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art appreciate that some embodiments of the disclosure are practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure is implementable in distributed system environments where local and remote computer systems, which are linked (either by hardwired data links, wireless data links, or by a combination of hardwired and wireless data links) through a network, both perform tasks. In a distributed system environment, program modules are located in both local and remote memory storage devices.

Embodiments of the present disclosure are implemented in cloud computing environments. In this description, "cloud computing" is defined as a model for enabling on-demand network access to a shared pool of configurable computing resources. For example, cloud computing is employed in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model includes various characteristics such as, for example, on-demand self-service, broad network access, resource pooling, rapid elasticity, measured service, and so forth. A cloud-computing model also exposes various service models, such as, for example, Software as a Service ("SaaS"), Platform as a Service ("PaaS"), and Infrastructure as a Service ("IaaS"). A cloud-computing model is deployed using different deployment models such as private cloud, community cloud, public cloud, hybrid cloud, and so forth. In this description and in the claims, a "cloud-computing environment" is an environment in which cloud computing is employed.

Figure 13:
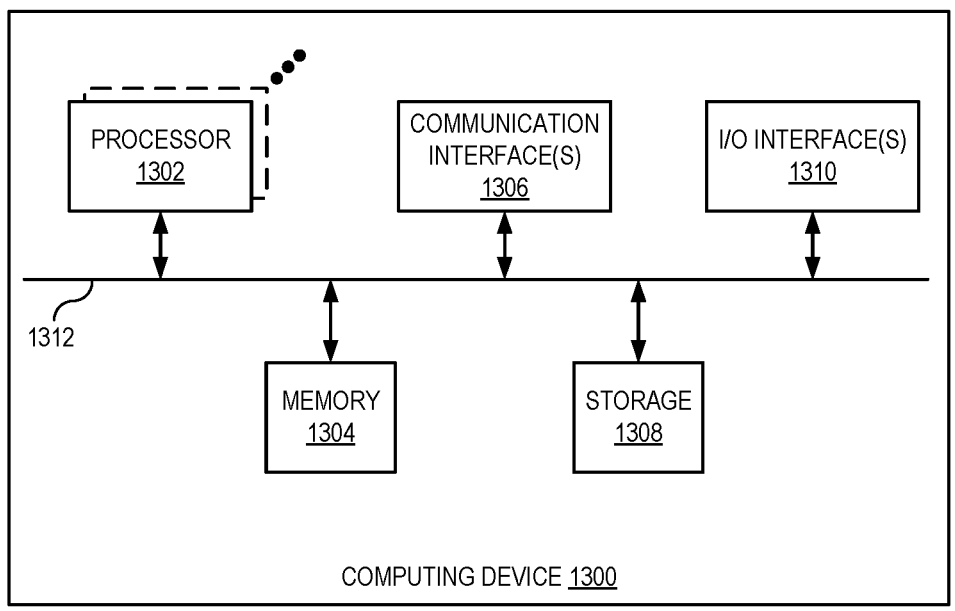
FIG. 13 illustrates a block diagram of an exemplary computing device in accordance with one or more embodiments.

FIG. 13 illustrates, in block diagram form, an exemplary computing device 1300 that is configured to perform one or more of the processes described above. One appreciates that one or more computing devices such as the computing device 1300 implement the content design system. As shown by FIG. 13, the computing device comprises a processor 1302, memory 1304, one or more communication interfaces 1306, a storage device 1308, and one or more I/O devices/interfaces 1310. In certain embodiments, the computing device 1300 includes fewer or more components than those shown in FIG. 13. Components of computing device 1300 shown in FIG. 13 are described in additional detail below.

In particular embodiments, processor(s) 1302 includes hardware for executing instructions, such as those making up a computer program. As an example, and not by way of limitation, to execute instructions, processor(s) 1302 retrieves (or fetch) the instructions from an internal register, an internal cache, memory 1304, or a storage device 1308 and decode and execute them. In various embodiments, the processor(s) 1302 includes one or more central processing units (CPUs), graphics processing units (GPUs), field programmable gate arrays (FPGAs), systems on chip (SoC), or other processor(s) or combinations of processors.

The computing device 1300 includes memory 1304, which is coupled to the processor(s) 1302. The memory 1304 is used for storing data, metadata, and programs for execution by the processor(s). The memory 1304 includes one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1304 includes internal or distributed memory.

The computing device 1300 further includes one or more communication interfaces 1306. A communication interface 1306 includes hardware, software, or both. The communication interface 1306 provides one or more interfaces for communication (such as, for example, packet-based communication) between the computing device and one or more other computing devices 1300 or one or more networks. As an example and not by way of limitation, communication interface 1306 includes a network interface controller (NIC) or network adapter for communicating with an Ethernet or other wire-based network or a wireless NIC (WNIC) or wireless adapter for communicating with a wireless network, such as a WI-FI. The computing device 1300 further includes a bus 1312. The bus 1312 comprises hardware, software, or both that couples components of computing device 1300 to each other.

The computing device 1300 includes a storage device 1308 includes storage for storing data or instructions. As an example, and not by way of limitation, storage device 1308 comprises a non-transitory storage medium described above. The storage device 1308 includes a hard disk drive (HDD), flash memory, a Universal Serial Bus (USB) drive or a combination these or other storage devices.

The computing device 1300 also includes one or more input or output ("I/O") devices/interfaces 1310, which are provided to allow a user to provide input to (such as user strokes), receive output from, and otherwise transfer data to and from the computing device 1300. These I/O devices/interfaces 1310 includes a mouse, keypad or a keyboard, a touch screen, camera, optical scanner, network interface, modem, other known I/O devices or a combination of such I/O devices/interfaces 1310. The touch screen is activated with a stylus or a finger.

The I/O devices/interfaces 1310 includes one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1310 is configured to provide graphical data to a display for presentation to a user. The graphical data is representative of one or more graphical user interfaces and/or any other graphical content as serves a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments include other specific forms without departing from its spirit or essential characteristics. The described embodiments are to be considered in all respects only as illustrative and not restrictive. For example, the methods described herein are performable with fewer or more steps/acts or the steps/acts are performable in differing orders. Additionally, the steps/acts described herein are repeatable or performable in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor is it to be understood to, imply that a given embodiment requires at least one of A, at least one of B, or at least one of C to each be present.

We claim:

1. A method of synchronized editing of vector geometry comprising:
    receiving a vector object to be edited;
    generating a stencil mask of a first plurality of line segments of the vector object, the stencil mask representing segment placement and primitive types;
    identifying a match of the stencil mask to a second plurality of line segments of the vector object;
    determining that an edit has been performed on the first plurality of line segments; and
    synchronously editing the second plurality of line segments of the vector object based on the edit to the first plurality of line segments using a linear transform, wherein the linear transform defines a mapping from the first plurality of line segments at a first location on the vector object to the second plurality of line segments at a second location on the vector object, and wherein the linear transform indicates that the first plurality of line segments and the second plurality of line segments represent a repeating geometry.

2. The method of claim 1, wherein identifying the match of the stencil mask to the second plurality of line segments comprises:
   determining a set of line segments that are included in the second plurality of line segments but not included in the stencil mask; and
   identifying the second plurality of line segments including the set of line segments that are included in the second plurality of line segments but not included in the stencil mask.

3. The method of claim 1, wherein determining that an edit has been performed on the first plurality of line segments comprises:
   receiving, from a user interface, a request to displace an anchor point or control point of the first plurality of line segments to a new position.

4. The method of claim 1, wherein identifying a match of the stencil mask to a plurality of line segments comprises:
   comparing one or more pluralities of line segments of the vector object to the stencil mask using a first anchor point of the vector object;
   determining that the plurality of line segments of the one or more pluralities of line segments includes line segments that all match a primitive type and anchor point of the stencil mask; and
   storing the plurality of line segments as a match.

5. The method of claim 4, further comprising determining the linear transform between the first plurality of line segments and the second plurality of line segments.

6. The method of claim 1, wherein identifying a match of the stencil mask to a plurality of line segments comprises:
   comparing one or more pluralities of line segments of the vector object to the stencil mask using a first anchor point of the vector object;
   determining that the plurality of line segments of the one or more pluralities of line segments includes a first set of line segments that match a primitive type and anchor point of the stencil mask and second set of line segments that do not match the primitive type or anchor point of the stencil mask; and
   adjusting the stencil mask by one anchor point and performing an additional comparison.

7. The method of claim 2, wherein the stencil mask indicates a selection status of a line segment and the primitive type of each line segment.

8. A system comprising:
   a memory component; and
   a processing device coupled to the memory component, the processing device to perform operations comprising:
      receiving a vector object to be edited;
      generating a stencil mask of a first plurality of line segments of the vector object, the stencil mask representing segment placement and primitive types;
      identifying a match of the stencil mask to a second plurality of line segments of the vector object;
      determining that an edit has been performed on the first plurality of line segments; and
      synchronously editing the second plurality of line segments of the vector object based on the edit to the first plurality of line segments using a linear transform, wherein the linear transform defines a mapping from the first plurality of line segments at a first location on the vector object to the second plurality of line segments at a second location on the vector object, and wherein the linear transform indicates that the first plurality of line segments and the second plurality of line segments represent a repeating geometry.

9. The system of claim 8, wherein the operation of identifying the match of the stencil mask to the second plurality of line segments includes operations comprising:
   determining a set of line segments that are included in the second plurality of line segments but not included in the stencil mask; and
   identifying the second plurality of line segments including the set of line segments that are included in the second plurality of line segments but not included in the stencil mask.

10. The system of claim 8, wherein the operation of determining that an edit has been performed on the first plurality of line segments includes operations comprising:
    receiving, from a user interface, a request to displace an anchor point or control point of the first plurality of line segments to a new position.

11. The system of claim 8, wherein the operation of identifying a match of the stencil mask to a plurality of line segments includes operations comprising:
    comparing one or more pluralities of line segments of the vector object to the stencil mask using a first anchor point of the vector object;
    determining that the plurality of line segments of the one or more pluralities of line segments includes line segments that all match a primitive type and anchor point of the stencil mask; and
    storing the plurality of line segments as a match.

12. The system of claim 8, the operations further comprising determining the linear transform between the first plurality of line segments and the second plurality of line segments.

13. The system of claim 8, wherein the operation of identifying a match of the stencil mask to a plurality of line segments includes operations comprising:
    comparing one or more pluralities of line segments of the vector object to the stencil mask using a first anchor point of the vector object;
    determining that the plurality of line segments of the one or more pluralities of line segments includes a first set of line segments that match a primitive type and anchor point of the stencil mask and second set of line segments that do not match the primitive type or anchor point of the stencil mask; and
    adjusting the stencil mask by one anchor point and performing an additional comparison.

14. The system of claim 8, wherein the stencil mask indicates a selection status of a line segment and the primitive type of each line segment.

15. A non-transitory computer-readable medium storing executable instructions, which when executed by a processing device, cause the processing device to perform operations comprising:
    receiving a vector object to be edited;
    generating a stencil mask of a first plurality of line segments of the vector object, the stencil mask representing segment placement and primitive types;
    identifying a match of the stencil mask to a second plurality of line segments of the vector object;
    determining that an edit has been performed on the first plurality of line segments; and synchronously editing the second plurality of line segments of the vector object based on the edit to the first plurality of line segments using a linear transform, wherein the linear transform defines a mapping from the first plurality of line segments at a first location on the vector object to the second plurality of line segments at a second location on the vector object, and wherein the linear transform indicates that the first plurality of line segments and the second plurality of line segments represent a repeating geometry.

16. The non-transitory computer-readable medium of claim 15, wherein instructions, which when executed by a processing device, cause the processing device to perform the operation of identifying the match of the stencil mask to the second plurality of line segments further cause the processing device to perform operations comprising:
   determining a set of line segments that are included in the second plurality of line segments but not included in the stencil mask; and
   identifying the second plurality of line segments including the set of line segments that are included in the second plurality of line segments but not included in the stencil mask.

17. The non-transitory computer-readable medium of claim 15, wherein instructions, which when executed by a processing device, cause the processing device to perform the operation of determining that an edit has been performed on the first plurality of line segments further cause the processing device to perform operations comprising:
   receiving, from a user interface, a request to displace an anchor point or control point of the first plurality of line segments to a new position.

18. The non-transitory computer-readable medium of claim 15, wherein instructions, which when executed by a processing device, cause the processing device to perform the operation of identifying a match of the stencil mask to a plurality of line segments further cause the processing device to perform operations comprising:
   comparing one or more pluralities of line segments of the vector object to the stencil mask using a first anchor point of the vector object;
   determining that the plurality of line segments of the one or more pluralities of line segments includes line segments that all match a primitive type and anchor point of the stencil mask; and
   storing the plurality of line segments as a match.

19. The non-transitory computer-readable medium of claim 15, the operations further causing the processing device to perform operations comprising determining the linear transform between the first plurality of line segments and the second plurality of line segments.

20. The non-transitory computer-readable medium of claim 15, wherein instructions, which when executed by a processing device, cause the processing device to perform the operation of identifying a match of the stencil mask to a plurality of line segments further cause the processing device to perform operations comprising:
   comparing one or more pluralities of line segments of the vector object to the stencil mask using a first anchor point of the vector object;
   determining that the plurality of line segments of the one or more pluralities of line segments includes a first set of line segments that match a primitive type and anchor point of the stencil mask and second set of line segments that do not match the primitive type or anchor point of the stencil mask; and
   adjusting the stencil mask by one anchor point and performing an additional comparison.

* * * * *